April 14, 1970 D. E. AUNSPACH 3,506,242
VALVE WITH COMPRESSIBLE SEAL MEANS
Filed Sept. 11, 1967
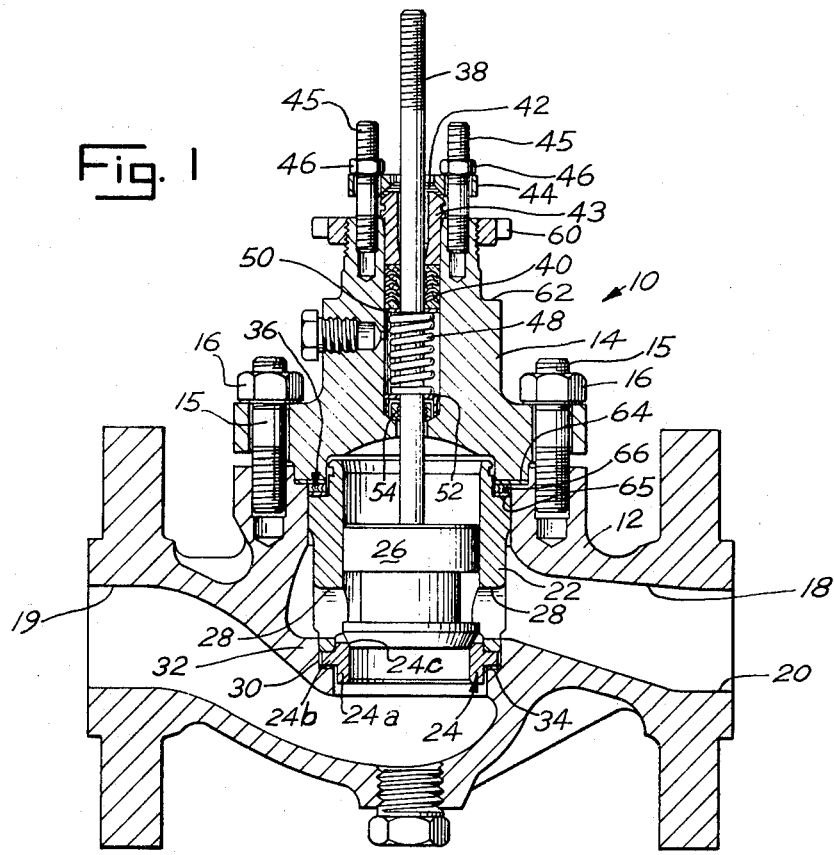
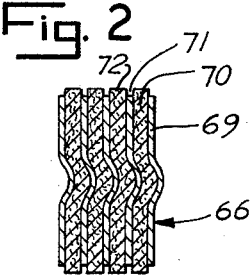
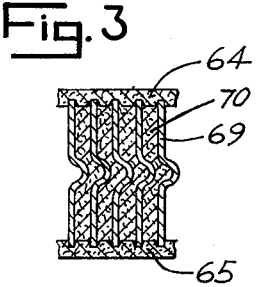
INVENTOR.
DALE E. AUNSPACH
BY
ATTORNEY

United States Patent Office 3,506,242
Patented Apr. 14, 1970

3,506,242
VALVE WITH COMPRESSIBLE SEAL MEANS
Dale E. Aunspach, Marshalltown, Iowa, assignor to
Fisher Governor Company
Filed Sept. 11, 1967, Ser. No. 666,604
Int. Cl. F16k 51/00
U.S. Cl. 251—361          1 Claim

ABSTRACT OF THE DISCLOSURE

A valve having a valve housing comprised of a valve body and a bonnet, a valve cage in said valve housing engaging a seat ring and compressible seal means remote from the seat ring and between the bonnet and the valve cage. The seal means are comprised of a bonnet gasket, a flat gasket, and a spirally-wound cage gasket, which is made from a relatively rigid strip and a relatively soft compessible filler strip, disposed between the bonnet gasket and flat gasket. The bonnet gasket and flat gasket are made from material having some cold flow to permit extrusion of the material of the bonnet gasket and flat gasket to further compress the filler strip of the cage gasket.

SUMMARY OF THE INVENTION

This invention relates to valves, and more particularly, to a valve having improved compressible seal means therein.

Fluid flow valves basically comprise a valve body having a fluid flow passage therethrough, a valve seat in the valve body and a valve plug movable toward and away from the valve seat to control the flow of fluid through the flow passage. A variation of this basic valve includes a valve cage disposed within the valve body, with the valve plug slidably guided within the valve cage for movement toward and away from a seat formed at one end of the valve cage. Compressible seal means are often arranged between the valve cage and the valve body.

Such compressible seal means are subject to the high temperatures of process fluid carried in the flow passage. When the seal means are exposed to high temperature, load relaxation of the seal means occurs, resulting in seal failure. Thus, it would be desirable to locate the compressible seal means at the end of the valve cage remote from the fluid in the flow passage. It would also be desirable to provide a seal having sealing properties superior to those utilized at the present time.

An object of the present invention is to provide an improved compressible seal for use between cooperating elements in a valve, such compressible seal comprising a pair of flat gaskets and a flexible multistrip spiral-wound gasket disposed between the flat gaskets and cooperating therewith in a novel manner to provide an efficient seal.

Another object of the present invention is to provide a valve having a compressible seal means comprising a spiral-wound flexible gasket sandwiched between a pair of flat gaskets, the flexible gasket being made from a relatively rigid strip and a relatively soft filler strip wider than the rigid strip and extending from opposite edges thereof.

Yet another object of the present invention is to provide a valve having a compressible seal of improved design remote from the fluid flow passage for minimizing adverse effects of high temperature of the process fluid in the flow passage of such seal. Other objects and advantages of the present invention will be made more apparent hereinafter.

BRIEF DESCRIPTION OF THE DRAWING

The attached drawing illustrates a preferred embodiment of the present invention in which:

FIG. 1 is a cross-sectional view of a valve construction embodying the present invention;

FIG. 2 is a cross-sectional detail view of a portion of the spiral-wound cage gasket of the compressible seal means before compression thereof between the flat gaskets; and FIG. 3 is a detail cross-sectional view of the compressible seal means illustrating the spiral-wound cage gasket sandwiched between the pair of flat gaskets.

DESCRIPTION OF THE PREFERRED EMBODIMENT

Referring now to FIG. 1 of the drawing, there is illustrated a valve 10 embodying the present invention. The valve 10 comprises a valve housing defined by a valve body 12 and a valve bonnet 14 secured to one another by suitable fastening means, as for example, a plurality of studs 15 and nuts 16. Formed within the valve housing is a fluid flow passageway 18 communicating an inlet 19 with an outlet 20. The valve body 12 is adapted to be connected in circuit with a flow conduit in a conventional manner.

Disposed within the valve housing is a valve cage 22, a seat ring 24 and a valve plug 26 slidably guided within the valve cage 22 for movement toward and away from the valve seat 24. The valve cage 22 comprises a tubular sleeve-like member having a plurality of openings or windows 28 provided in the wall thereof.

The valve seat ring 24 is formed of an annular ring-like member 24a having seating surface 24c defined at one end thereof about the opening or orifice therethrough. Extending outwardly from the seat ring portion 24a is a lug-like annular portion 24b which is adapted to seat in the stepped or recessed portion 30 in the wall 32 of the valve body 12. The valve cage 22 and the seat ring 24 are sandwiched between gasket 34 and seal means 36, then clamped in place between the valve body 12 and the valve bonnet 14 by tightening down nuts 16. The compressible seal means 36 of the present invention will be considered in more detail hereafter.

The flat gasket 34 provides a seal between the seat ring 24 and the stepped shoulder 30 in wall 32. In addition, the gasket 34 is hard enough to support the stem load when the valve plug 26 is seated on the seating surface 24c of seat ring 24.

Secured to the valve plug 26 for operating the same within the valve cage 22 for movement toward and away from the valve seat 24 is a valve stem 38. The valve stem 38 is suitably secured to the valve plug 26 at its lower end and is provided with means, as for example, external threads at its upper end, for permitting connection of the valve stem to an actuator mechanism.

Suitable packing means are provided about the valve stem 38 within the valve bonnet 14. Such packing means may include a packing 40, a felt wiper ring 42 and a packing follower 43 retained within the bonnet 14 by means of a flange member 44 secured on the bonnet 14 by suitable connecting means. Such connecting means may include studs 45 and nuts 46 threaded onto the studs. A spring 48 is disposed concentrically about the valve stem 38 for maintaining compression of the packing 40. At its upper end the spring 48 bears upon a spring retainer 50, and at the other end the spring 48 bears upon a cup-shaped retainer 52 positioned about a wiper ring 54 on the valve stem 38.

An internally-threaded yoke lock nut 60 is disposed on external threads on the bonnet 14. It will be understood that the yoke for a suitable actuator mechanism for the valve may be secured on the bonnet 14 between the yoke lock nut 60 and the shoulder 62 formed on the exterior of the bonnet.

A feature of this invention is the provision of unique compressible seal means between the valve cage and the valve bonnet at a location remote from the fluid passing through the fluid flow passageway 18. The compressible seal means 36 is comprised of a first gasket or bonnet gasket 64 which is preferably disposed between abutting surfaces of the bonnet 14 and the valve body 12 to provide a seal to atmosphere. In the embodiment illustrated, the bonnet gasket is directly loaded by the nuts 16 as they are threaded down upon the studs 15 to give a positive, reliable seal which is independent of machinery tolerances. The seal means 36 also includes a second flat gasket 65 and a cage gasket 66 disposed between the gaskets 64 and 65.

The cage gasket 66 is a flexible spiral-wound gasket designed to provide a flexible member between the valve cage 22 and the valve bonnet 14 to allow for dimensional variations among the valve body, the valve seat ring 24 and the stepped portion 30 provided within the wall 32 of the valve body 12. Further, in the event a balanced valve plug were utilized in the valve cage (as shown for example in the copending application of C. Ward Sheldon Ser. No. 666,894, filed Sept. 11, 1967), the cage gasket would make a seal between the inside and outside of the valve cage. Briefly, a balanced valve plug has axial equalizing holes or bores extending through the valve plug from the bottom to the top to communicate the fluid flow passage with the space defined above the valve plug and the cage gasket would perform the additional function of sealing between the space above the valve plug and the exterior of the valve cage. The cage gasket 66 is located at the top of the cage, as far as possible from the fluid passing through the passageway 18. The cage gasket is therefore away from high temperature fluid that may be present in the passageway 18. The gasket 66 is located where the temperature is lowest so that load relaxation and the resultant loss of sealing is minimized.

The gasket 65 is located under the spiral wound gasket 66 so as to sandwich the spiral wound gasket between the gaskets 64 and 65. The purpose of the sandwich construction is to insure a leak-tight joint which with some fluids cannot be obtained by use of the spiral-wound gasket alone.

Referring now to FIGS. 2 and 3, there is better illustrated the detail of the seal means 36 of the present invention. The cage gasket 66 in its uncompressed state comprises a pair of spirally-wound strips 69 and 70. The strip 69 may be formed from a relatively rigid material such as metal and the filler strip 70 may be formed from a relatively soft material as, for example, asbestos sheet. In one form of the invention, strip 69 is formed from stainless steel. It is noted that in the uncompressed state the strip 70 is wider than the strip 69 and extends on each side beyond the strip 69 so as to define grooves 71 and lands 72 at the opposite edges of the spiral wound gasket.

The specific material utilized for the gaskets 34, 64 and 65 will be dependent upon the temperature and the application for the valve. For example, at temperatures up to about 700° F., the gaskets 34, 64 and 65 may be made from compressed asbestos sheet. For temperatures higher than about 700° F. the gasket material may be either metal-jacketed asbestos or a soft metal.

In FIG. 3 there is illustrated the compressed condition of the seal means 36 when the bonnet 14 is bolted to the valve body 12. The metal strip 69, being relatively hard and rigid, yields somewhat intermediate the edges but at the ends digs into and extrudes or deforms material from the relatively soft gaskets 64 and 65, which have limited cold flow properties. The extruded material forces the filler material 70 to be further compressed so as to enhance the sealing ability of the seal means. Essentially, then the material of the gaskets 64 and 65 compresses the filler material 70 in the spiral wound gasket 66 when the seal means 36 is placed under compression between the bonnet 14 and body 12, resulting in more intimate contact between the components of seal means 36.

The present invention provides a valve construction having improved compressible seal means for effectively sealing between the upper end of the valve cage and the valve bonnet. In the form of the invention illustrated, the upper gasket or bonnet gasket also provides a seal between the valve bonnet and the valve body. The unique seal means thus functions to provide a tight seal between the interior of the valve 10 and the atmosphere and also functions to accommodate dimensional variations between the valve cage 22, the seat ring 24 and the wall 32 of the body 12. In the event a balanced valve plug were used in cage 22, the seal means 36 would also function to seal between the top of the valve plug and the exterior of the valve cage. Tests have been conducted comparing the seal means of the present invention with a similarly located seal formed only of a spiral wound gasket (and without the flat gaskets 64 and 65), and it has been found that on the average, the present seal results in a 40 percent reduction in leak rate.

What is claimed is:

1. In a valve comprising a valve housing including a valve body having a fluid flow passage therein communicating an inlet and an outlet and a valve bonnet joined to the valve body, annular seat means in said valve body having an opening therethrough forming a part of said flow passage, a tubular valve cage in said valve body abutting said seat means, said valve cage having openings therein forming a part of said flow passage, and a valve plug guided in the valve cage for movement toward and away from the seat means to control fluid flow through the flow passage, the improvement comprising compressible seal means between the valve bonnet and valve cage remote from the flow passage for accommodating dimensional variations among the valve body, the seat means and the valve cage, said seal means comprising a bonnet gasket, a flexible spiral-wound cage gasket, and a flat gasket, the cage gasket being disposed between the bonnet gasket and the flat gasket, said cage gasket comprising a rigid strip and a relatively soft filler strip, the filler strip being wider than the rigid strip and extending beyond opposite edges of the rigid strip prior to compression of the cage gasket between the bonnet gasket and flat gasket so as to form grooves and lands along opposite edges of the cage gasket, said bonnet gasket and said flat gasket being made from material having limited cold flow, the seal means being compressed between the valve bonnet and the valve cage whereby the material of the bonnet gasket and flat gasket will cold flow to further compress the filler strip and form a more effective seal.

References Cited

UNITED STATES PATENTS

| 831,742 | 9/1906 | Pomnall | 251—362 |
| 951,407 | 3/1910 | Moore | 137—454.6 |
| 2,357,257 | 8/1944 | Goetze | 277—204 |
| 2,634,944 | 4/1953 | Waite | 137—454.6 |
| 2,845,085 | 7/1958 | Robbins | 137—454.6 |
| 2,882,083 | 4/1958 | Palumbo et al. | 277—204 XR |
| 3,132,870 | 5/1964 | Pschera | 277—204 |
| 3,228,655 | 1/1966 | Weise | 251—362 |
| 3,330,294 | 7/1967 | Manning et al. | 137—454.6 XR |

FOREIGN PATENTS

| 24,189 | 1912 | Great Britain. |
| 173,461 | 11/1960 | Sweden. |

SAMUEL SCOTT, Primary Examiner